July 1, 1958

H. HORLACHER 2,841,053

TRACER CONTROLLED ANGULAR CUTTER

Filed Feb. 20, 1956

INVENTOR.
HERMAN HORLACHER.
BY
*H. K. Parsons & L. W. Wright.*
ATTORNEYS.

July 1, 1958 H. HORLACHER 2,841,053
TRACER CONTROLLED ANGULAR CUTTER
Filed Feb. 20, 1956 2 Sheets-Sheet 2
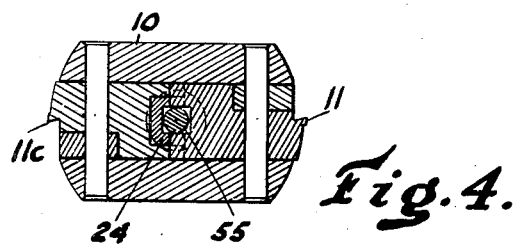
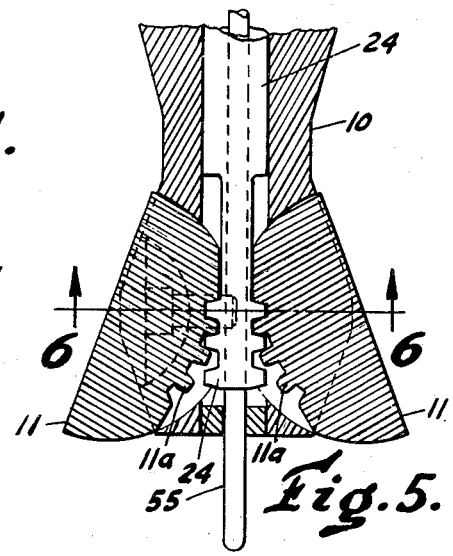
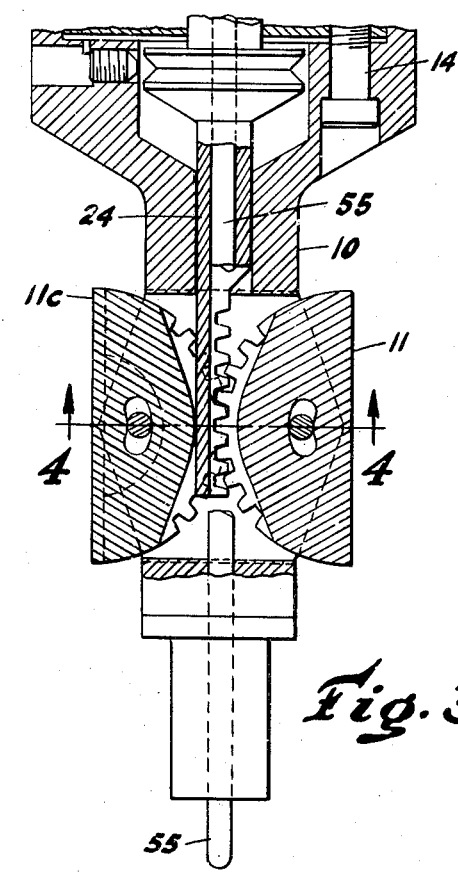
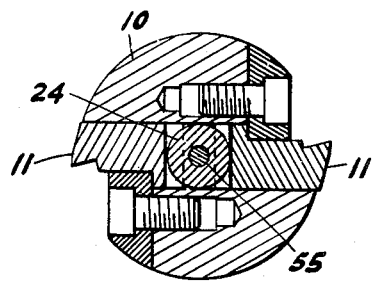
INVENTOR.
HERMAN HORLACHER.
BY
N. K. Parsons & L. W. Wright.
ATTORNEYS United States Patent Office 2,841,053
Patented July 1, 1958

2,841,053

TRACER CONTROLLED ANGULAR CUTTER

Herman Horlacher, Cincinnati, Ohio, assignor to The Cincinnati Milling Machine Co., Cincinnati, Ohio, a corporation of Ohio Application February 20, 1956, Serial No. 566,503

9 Claims. (Cl. 90—13.5)

This invention relates to cutter mechanisms and more particularly to a variable conical cutter mechanism in which the angle of the cutter blade may be continually varied with respect to its axis of rotation during a machining operation to vary the angle of the conical or beveled surface being cut.

In setting up a milling machine to mill bevel or angular surfaces such as the edge of a work piece, it is usually necessary either to tilt the work itself or to tilt the cutter axis in order to bring the parts into the necessary angular relationship. The conventional vertical spindle milling machine, for example, does not make provision for angular adjustment of the spindle axis with respect to the surface of the work support, and therefore it is necessary to either tilt the work or to use fixed conical cutters of the particular angle desired. Such methods can be used where the angle of the work surface to be machined is constant.

The problem is now arising of milling angular surfaces in which the angle of the surface varies along its length. A good example of this problem is in milling the sides of spars which form the framework of aircraft wings. In such cases the bevel angle has to change to suit the streamline shape of the parts to be connected therewith. Such problems become further complicated since it has been found necessary to determine a reference plane from which the angle is to be measured so that the outline or contour of the work in that plane will be accurately shaped to the outline of a desired pattern. This means that the apex of the angles of the elements that make up the side surface must lie in the line which forms the outline or shape of the work.

For instance, if the work piece has parallel top and bottom surfaces, one of the surfaces must be chosen as the reference plane in which the outline of the work is laid out and the apex of the angles of the side surfaces must lie in this line.

Therefore, one of the principal objects of this invention is to provide a simple, compact, self-contained variable angle cutter mechanism for automatically and progressively changing the angle during traverse of the cutter.

Another object of this invention is to provide a mechanism of the character described which is compact and may be attached to a suitable machine tool spindle, such as a milling machine spindle with a minimum of changes or alterations.

A further object of this invention is to provide a device of the character described which is automatic tracer controlled and in which the tracer is embodied in the cutter body to obtain a direct acting mechanism.

A still further object of this invention is to provide a mechanism of the character described which is automatic in operation, and indicates at all times the angular setting of the cutter blades.

A further object of this invention is to provide a hydraulic actuable tracer controlled mechanism which will automatically vary the angle of the cutter blades during the machining operation according to a prescribed pattern, and yet be relatively simple, inexpensive, trouble-free, and simple to operate by an unskilled operator.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Referring to the drawings in which like reference numerals indicate like or similar parts:

Figure 3 is a partial sectional view of the cutter body and blades showing an alternate construction for small diameter cutters.

Figure 4 is a sectional view showing the relationship of the cutter blades, rack, tracing finger, and cutter body as viewed on the line 4—4 of Figure 3.

Figure 5 is a sectional view showing another alternate construction for small diameter cutters.

Figure 6 is a cross sectional view on line 6—6 of Figure 5.

Figures 1, 2:
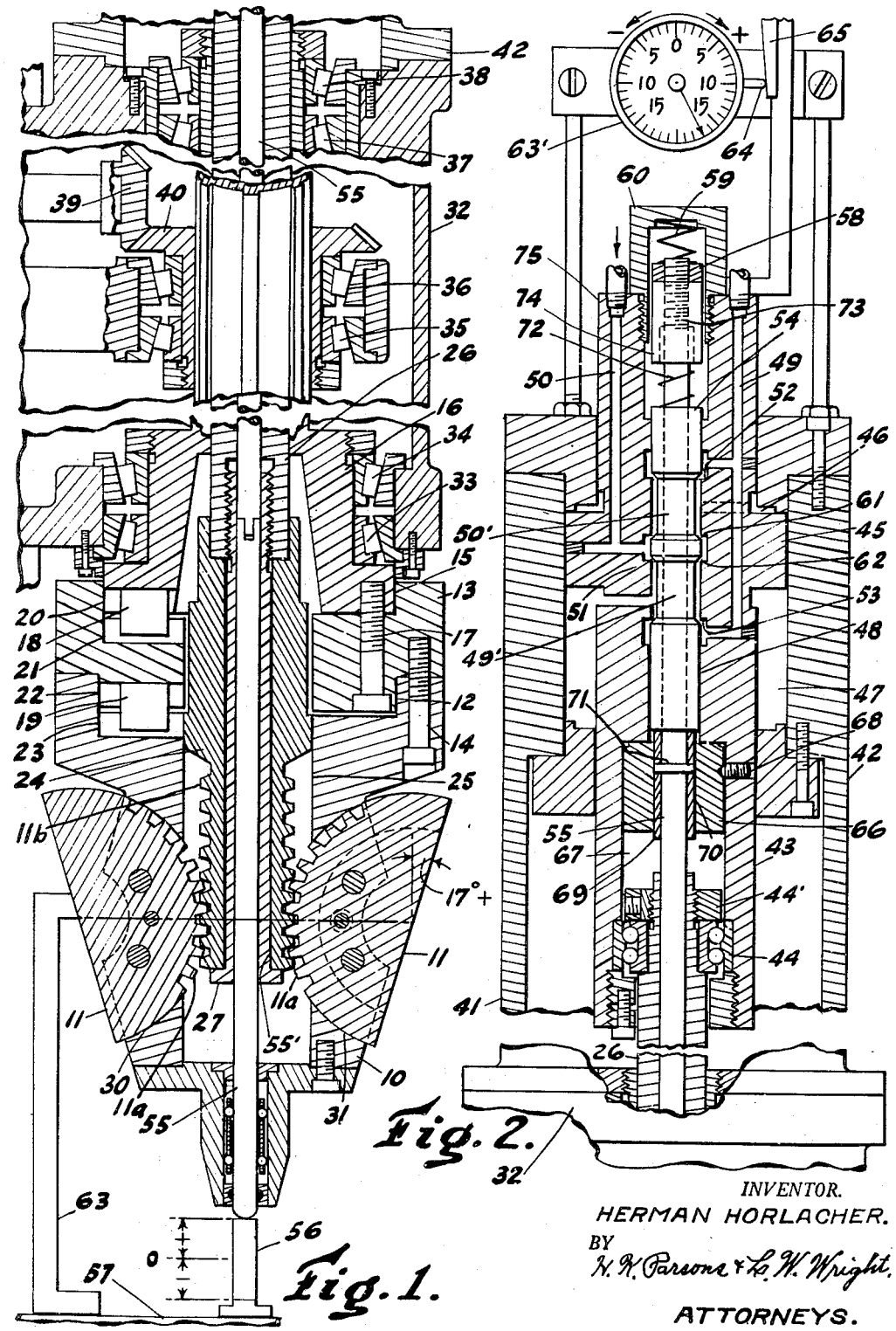
Figure 1 is a vertical sectional view of the lower portion of the cutter adjustment mechanism.
Figure 2 is a vertical sectional view of the upper portion of said cutter adjustment mechanism.

Referring to the drawings, Figures 1 and 2 show a preferred embodiment of the invention consisting essentially of a cutter head 10 having angularly adjustable blades 11 and mechanism within the spindle carrier for making the angular adjustment of said cutter blades 11 during rotation of the head. The cutter head 10 has a counterbore 12 formed in the upper end thereof, as viewed, for receiving an adapter plate 13 secured thereto by suitable bolts 14. The adapter plate 13, in turn, has a counterbore 15 formed on the upper side thereof which fits the end of a conventional spindle nose of the spindle 16 and is secured thereto by suitable bolts 17. Rotational movement from the spindle 16 is transmitted to the cutter body 10 by action of keys 18 and 19 fitted into keyways or cross slots 20 and 21, and 22 and 23 respectively formed in the spindle 16, adapter 13, and cutter body 10.

A hollow circular rack member 24 is reciprocably mounted in a bore 25 formed in the cutter body 10 and is connected to and actuated by a draw bar 26 by means of a bushing member 27 pressed into the bore of the rack 24 and threaded in the lower end of said draw bar 26.

The cutter head 10 is provided with a pair of arcuate slots 30 and 31 for receiving the pivotable cutter blades 11, and these slots intersect the central bore 25 formed in said cutter head 10. The cutter blades are semi-circular in shape and have gear teeth 11a formed on their semi-circular periphery which intermesh with the circular rack teeth 11b on the rack member 24. From this it will be seen that if the draw bar 26 is moved axially, the rack bar 24 will rotate the cutter blades 11 and thus vary the angle of the cutting edges on the blades. Although the cutter head 10 is provided with only two cutter blades, it will, of course, be understood that this number may be varied without departing from the principles of this invention.

The cutter blades 11 are securely held in the slots 30 and 31 by any suitable retaining means, such as that shown in the copending application No. 317,966 of Phillip C. Hewett, filed October 31, 1952, now Patent No. 2,791,946 issued May 14, 1957. Therefore, a more detailed description thereof has been omitted, but it will suffice to say that the blades 11 are held firmly in place at all times and are adapted to be rotatably adjusted during the machining operation by actuation of the draw bar 26, through the rack 24.

As viewed, the spindle 16, which is part of the conventional machine to which this invention is attached, is rotatably mounted in a vertical spindle carrier 32 by means of suitable bearings 33, 34, 35, 36, 37, and 38 and is rotated by a conventional driving means, not shown, through bevel gear 39 in mesh with a second bevel gear 40, which in turn is slidably mounted on a splined portion of said spindle 16. In addition, bearings 35 and 36 rotatably support and hold bevel gear 40 in a fixed position against axial movement and in engagement with bevel gear 39 at all times during axial adjustment of the spindle position.

With reference to Figure 2 of the drawings, a hydraulic servomotor or actuator has been provided to effect tilting of said cutter blades 11 and is indicated generally by the reference numeral 41. The servo-motor 41 consists essentially of housing member 42 mounted on top of the spindle carrier 32 in any conventional manner having a piston member 45 slidably mounted therein and connected to the upper end of the draw bar 26 by piston rod 43. To eliminate possible rotation of the piston, the connection includes thrust bearings 44 and nut 44' threaded on said draw bar 26.

As shown, the piston rod 43 is connected to the piston 45, which, in turn, is positioned within the housing member 42 so as to form hydraulic pressure chambers 46 and 47. The connecting rod 43, in addition, has a central bore 48 for receiving a servo-valve plunger 54. Interconnecting hydraulic feed channels 49 and 50 are formed in said piston 45 and connecting to a plurality of annular grooves formed on the inner circumference thereof forming pressure ports 61 and 62 and exhaust ports 52 and 53. The servo-valve plunger 54 is slidably mounted in said central bore 48 and has a plurality of cannelures 49' and 50' formed thereon for cooperative relationship with said annular grooves.

With reference to Figure 1, tracing finger 55 is slidably mounted in passage means comprising a central bore 55' formed in the draw bar 26 and hollow sleeve 27 secured in the bore. The finger projects from the lower end of the cutter body 10 for engagement with a template 56 mounted on the work table 57. The upper end of the tracing finger 55, as shown in Figure 2, projects beyond the other end of the body for attachment to the valve plunger 54.

The tracing finger first passes through a lubricating block 66 secured in the end bore 67 of the piston rod 43 by set screw 68. This block 66 has a sleeve 69 inserted in the bore 70 thereof and held therein by a pin 71. It will be noted that the sleeve projects beyond the end of the block into engagement with the end of the valve plunger 54 which is not integrally connected to the tracer finger 55. The sleeve 69 serves as an abutment on the tracer finger, and the valve member 54 is held in engagement with this abutment by a spring 72 engaging the upper end of the valve plunger.

The upper end of the tracer finger 55 is threaded at 73 and an adjusting sleeve 74 and lock nut 58 are threaded thereon. A second spring 59 is interposed between the upper end of the tracer finger and the cap 60 secured to the upper end of the piston rod 75.

The sleeve 74 and lock nut 58 are provided for varying the tension of the spring 59 without changing the position of the tracer, since the spring controls the pressure of the tracer finger on the template. The intermediate spring 72 allows the sleeve 74 to be adjusted relative to the valve member 54 while still maintaining the valve member in engagement with the abutment sleeve 69.

In operation, if a source of hydraulic pressure is applied to channel 50 and exhausted through channel 49, the hydraulic pressures at ports 61 and 62 will be equal and thus chambers 46 and 47 will also be of equal pressure, and therefore there will not be any relative movement of the piston 45. If the height of the template 56, which has a surface contour relative to the desired bevel to be produced on the work piece 63, changes so that the tracing finger 55 will be deflected downward to some point, say "O," the pressure at port 61 and chamber 46 will increase and the pressure at port 62 and chamber 47 will decrease, and thus hydraulic fluid as supplied through the feed line 50 will create such a resultant pressural force against the piston 45 that said piston will be forced downward. When the piston 45 is moved downward, the draw bar 26, as shown in Figure 1, and thus the rack 24 will also be forced downward, thus decreasing the angle of tilt of the cutter blades 11 to zero. The piston 45 will continue to move downward to follow the plunger 54 until the pressure at ports 61 and 62 and chambers 46 and 47 is equal, thus indicating that the angle of tilt of the cutter blades 11 is now zero corresponding to the height of the template.

In order to indicate the degree of tilt of the cutter blades 11, indicating means have been provided as shown in Figure 2 and consist essentially of a micro-gage 63' mounted on the housing 42 in any conventional manner and having the finger 64 thereof in engagement with a linear cam 65 which is operatively connected to the piston 45, thus giving a direct reading of the angular position or degree of tilt of the cutter blades 11.

Figures 3 and 4 show an alternative construction of the cutter assembly to be utilized in small diameter cutter considerations. Here, instead of the rack member 24 being circular, as shown in Figure 1, the rack now has a channel-shaped cross section. In this type of construction, the flanges on the member 24 have the teeth formed thereon, leaving a central passage for the tracer. The cutter blades 11 and 11c are also channeled, the teeth on the member 11 meshing with the teeth on both the rack member and the other cutter 11c. This makes it possible to reduce the overall diameter of the cutter.

Fiures 5 and 6 show a second alternative construction of the cutter assembly to be utilized in small diameter cutters. This particular arrangement utilizes again a circular rack 24 in mesh with the gear teeth 11a on the cutters 11 which have the gear teeth thereof formed on a reduced diameter portion of the cutter blades, thus again essentially eliminating the space as was previously required for mounting the circular rack 24.

Therefore, there has been disclosed a variable conical cutter mechanism including a cutter body having angularly adjustable blades to vary the apex angle of the conical cutter, and hydraulic means actuable by a tracing finger for adjusting the angle of the blades while the cutter body is rotating. As shown, the adjusting means is self-contained within the spindle housing having the axis of the tracing finger coincident with the axis of the cutter. Therefore, it can be seen that the cutter body and adjusting means form a device which can be manufactured as a unit and applied to any milling machine spindle of the type disclosed.

What is claimed is:

1. In a variable conical cutter having a body in which is supported angularly adjustable cutters and a draw bar axially slidable to adjust said cutters, the combination of a servomotor operatively connected to the end of said draw bar, including a servovalve and a tracing finger slidably mounted within said draw bar and projecting beyond the end of said body for engagement with a template to control actuation of said servovalve.

2. In a variable conical cutter having a body in which is supported angularly adjustable cutters and a draw bar axially slidable to adjust said cutters, the combination of a hydraulic actuator operatively connected to the end of said draw bar and having a hydraulic valve slidably mounted therein for controlling said actuator, a tracing finger slidably mounted within said draw bar having one end thereof connected to said valve and the opposite end projecting from said body for engagement with a template to control actuation of said valve.

3. In a variable conical cutter having a rotary body in which is supported angularly adjustable cutters and a draw bar axially slidable to adjust said cutters during rotation of the body, the combinaiton of a hydraulic actuator operatively connected to said draw bar and having a hydraulic valve slidably mounted therein for controlling said actuator, a tracer finger slidably mounted within said draw bar, the axis of which is coincident with the axis of rotation of said body, said tracer finger having one end thereof connected to said valve and the opposite end projecting beyond the end of said body for engagement with a template to actuate said valve.

4. In a pattern controlled variable conical cutter having a power rotatable body in which is supported angularly adjustable cutters, and a draw bar axially slidable in said body to adjust said cutters during rotation of said body, the combination of a hydraulic actuator connected to the end of said draw bar, a source of hydraulic pressure reversibly connectable to said actuator, said actuator having hydraulic valve means slidably mounted therein for reversing said hydraulic pressure, a tracer finger slidably mounted within said draw bar for relative movement with respect to said bar having one end thereof connected to control said valve means and the opposite end projecting beyond the end of said body for engagement with a template whereby movement of said tracer finger in one direction will open said valve means, and cause movement of said actuator in a direction to close said valve means to automatically and precisely adjust the cutting angle of said cutters by an amount directly proportional to the amount of movement of said tracer finger.

5. In a pattern controlled variable conical cutter having a rotatable body, angularly adjustable cutters mounted in said body, and a draw bar axially slidable in said body to adjust said cutters, the combination of a hydraulic actuator connected to the end of said draw bar, a source of hydraulic pressure reversibly connectible to said actuator, said actuator having hydraulic valve means slidably mounted therein for reversing the application of said hydraulic pressure, a tracer finger slidably mounted within said draw bar, the axis thereof coincident with the axis of rotation of said cutters and having one end thereof connected to control said valve means and the opposite end projecting beyond the end of said cutter body for engagement with a template whereby axial movement of said tracer finger in either direction will open said valve means.

6. In a pattern controlled variable conical cutter having a rotatable body, angularly adjustable cutters mounted in said body, and a draw bar axially slidable on the axis of said body to adjust said cutters, the combination of a fluid actuator connected to the end of said draw bar, a source of fluid pressure reversibly connectible to said actuator, said actuator having fluid valve means slidably mounted therein for reversing the effect of said fluid pressure, a tracer finger slidably mounted within said draw bar having one end thereof connected to control said valve means, and the opposite end projecting beyond the end of said cutter body for engagement with a template to hold the valve means in a neutral position whereby the tracing finger is responsive to undulations in the template during relative traverse therebetween to operate said valve means and precisely adjust the cutting angle of said cutters automatically by an amount directly proportional to the movement of said tracing finger during rotation and relative traverse of the cutters.

7. In a pattern controlled conical cutter having a rotatable body, angularly adjustable cutters mounted in the body and a draw bar axially slidable in said body to adjust the angle of said cutters, the combination of a fluid actuator connected to the end of said draw bar, a source of fluid pressure reversibly connectible to said actuator to effect reversible shifting of said draw bar, said actuator having valve means slidably mounted therein for reversing the effect of said fluid pressure and having a central position for balancing the effect of said pressure on said actuator, a tracing finger slidably mounted within said draw bar, the axis thereof coincident with the axis of rotation of said cutters, said finger having one end thereof connected to control said valve means and the opposite end projecting beyond the end of said cutter for engagement with a template to hold said valve means in a central position whereby movement of said tracing finger will open said valve means, thereby causing movement of said actuator in a direction to close said valve means to automatically and precisely adjust the cutting angle of said cutters by an amount directly proportional to the amount of deflection of said tracing finger.

8. In a variable conical cutter having a rotatable body and cutters supported in the periphery of said body for angular adjustment relative to the axis of rotation thereof, the combination of a power operable draw bar having a rack member slidable in said body along the axis thereof between adjacent sides of said cutters, gear teeth formed on said adjacent sides and intermeshing with said rack member, an axially movable tracer finger, said rack member being formed to provide passage means on the axis of said body and between said cutters for said tracer finger to permit independent movement thereof, said finger extending from one end of the body for engagement with a template and beyond the other end of the body for power control of said draw bar.

9. In a variable conical cutter having a rotatable body and inserted cutters angularly adjustable with respect to the axis of rotation of said body, the combination of a power operable draw bar having a rack member slidable in said body along the axis thereof, gear teeth formed on said cutters and intermeshing with said rack member for angular adjustment thereby, an axially movable tracer finger, said rack member being formed with channel passage means along the axis of the body for said tracer finger to permit independent movement thereof, said finger extending through one end of the body for engagement with the template and beyond the other end of the body for power control of said draw bar.

References Cited in the file of this patent

UNITED STATES PATENTS

| | | |
|---|---|---|
| 963,596 | Lescure | July 5, 1910 |
| 1,442,804 | Hicks | Jan. 23, 1923 |
| 2,624,242 | Eberle et al. | Jan. 6, 1953 |
| 2,723,598 | Mann | Nov. 15, 1955 |
| 2,770,173 | Ochse | Nov. 13, 1956 |